Oct. 31, 1939.  J. S. KIMBLE  2,177,661
METHOD AND APPARATUS FOR IMPROVING THERMOPLASTIC SHEETING
Filed Aug. 13, 1938
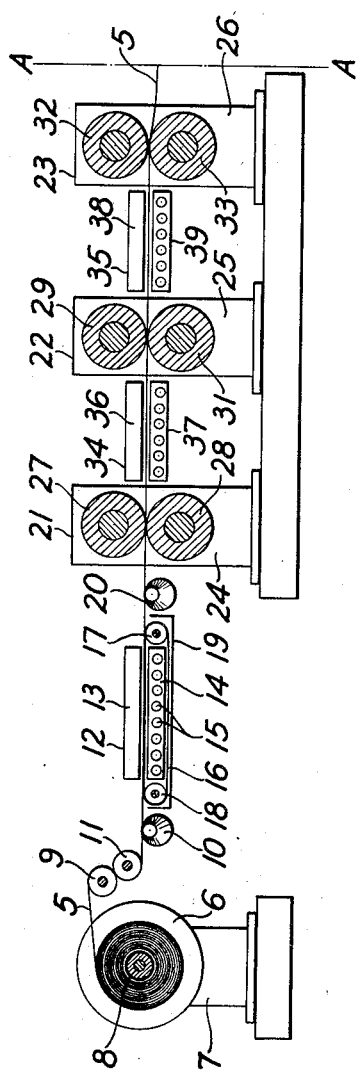
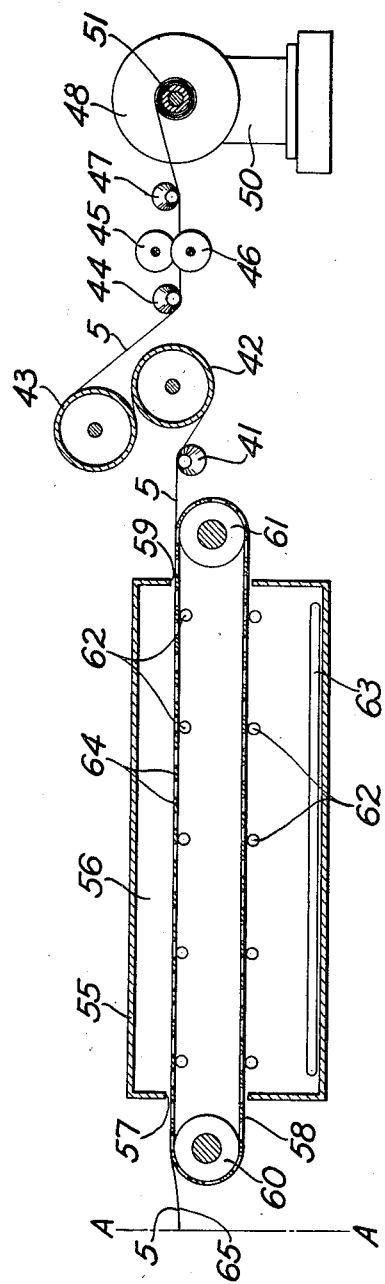
John S. Kimble
INVENTOR
BY  N. M. Perrins
D. I. Mayne
ATTORNEYS Patented Oct. 31, 1939

2,177,661

UNITED STATES PATENT OFFICE 2,177,661

METHOD AND APPARATUS FOR IMPROVING THERMOPLASTIC SHEETING

John S. Kimble, Kingsport, Tenn., assignor to Eastman Kodak Company, Rochester, N. Y., a corporation of New Jersey Application August 13, 1938, Serial No. 224,793

2 Claims. (Cl. 18—57)

This invention relates to methods and apparatus for processing thermoplastic sheeting materials and more particularly to a process and apparatus for improving the characteristics of transparent sheets of cellulose acetate, cellulose acetate propionate, ethyl and benzyl cellulose, and other organic derivatives of cellulose, and other suitable thermoplastic compositions which are employed in making laminated glass.

This application is a continuation in part of my copending joint application Serial No. 127,663 filed Feb. 25, 1937 and entitled "Method and apparatus for improving thermoplastic sheeting" and is an improvement over the invention described and claimed therein.

In making thermoplastic sheeting for use in laminated glass manufacture, the exact specifications of the sheeting is of considerable importance. While sheets of thermoplastic materials made in accordance with conventional methods may appear to be substantially uniform, in many instances it can be found by careful measurements that the sheets are of more or less non-uniform characteristics. That is for example, conventionally produced sheeting may vary in thickness or different sections of sheeting may exhibit different strengths; or two similarly appearing sections of sheeting made at different times may have the same physical appearance but have markedly different shrinkage characteristics, owing to variations in the process of manufacture.

These variations, particularly shrinkage, are a source of considerable difficulty in the manufacture of laminated "safety" glass. A satisfactory method of making such laminated glass is to place a transparent sheet of thermoplastic material between two sheets of plate glass having a coating of adhesive on the side of the glass adjacent to the plastic sheet and preliminarily pressing them together by suitable pressing apparatus. The final pressing is conducted in an autoclave at a high temperature and pressure. A suitable moisture proofing compound may then be placed around the edge of the lamination.

In such a process it will be seen that there are two periods of heating, the last being at a relatively high temperature and pressure. It is during these operations that the thermoplastic lamination tends to pull away from the glass and produce "blowins" which resemble elongated bubbles. Usually these "blowins" occur at the edges of the glass, making not only a stain from the heating fluid used in the autoclave, but also an uneven margin when the moisture proof sealing compound is used.

It has been found that an outstanding cause of such "blowins" is the presence of residual strains in the thermoplastic lamination and when the assembly is heated these strains are released, causing a distortion and shrinkage of the thermoplastic layer.

In the above identified copending application an apparatus and method is described for eliminating strains from thermoplastic sheeting so that the resulting processed sheet will have substantially uniform dimensions and have a low shrinking coefficient.

The invention contemplated in that application broadly comprised conducting a thermoplastic sheet through a heating chamber heated at a temperature sufficient to relieve residual strains in the sheet while exerting a minimum of tension on the sheet. The sheet is then alternately calendered and heated to reduce the sheet to desired dimensions. It is then hardened under substantially no tension and may be cut to size and immediately employed in laminated glass manufacture, or if desired wound on another spool without substantial tension being exerted thereon and employed in due course.

I have found that if the sheeting is employed for making laminated glass soon after this treatment an excellent product results, for sufficient residual strain has been equalized or relieved to eliminate faults due to shrinkage during the assembly process. However, in large scale commercial production it is quite impossible to employ the sheet immediately after it is processed, and it is customary, as pointed out in the above mentioned application to wind the sheeting on large spools which will handle 2000 feet or more of the sheeting. These spools are then stored at normal temperatures until used. It was found when the sheeting was immediately made up into laminated glass an excellent product was obtainable, but difficulty was had in making a finished sheeting which would lay entirely flat when it was unwound from the spool after storage. This was found to be caused by almost infinitesimal ridges on the circumference of the sheeting on the spools. These ridges are located at points where there is a slightly thick section in the sheet, oftentimes so slight as not to be detected with micrometer calipers. These small thickness variations when built up by the many turns of sheeting in the spool culminated in quite an additive effect which is very apparent in the surface of the spool. Also any slightly thin sections of the sheet create valleys which tended to exaggerate the raised portions.

Usually, a finished spool, when taken immediately off the winder of the production machine, shows no ridges at all or only slight ridges. However, if one of these rolls is stored for about a week, or in unusually hot weather for only a day, very decided ridges develop in the sheet and consequently the sheet buckles when it is unwound. It was discovered that at room temperatures there is shrinkage of the sheeting lengthwise tending to shorten it. This shrinking caused the sheet to contract on the spool thereby bringing out in relief all the variations in thickness so that they appeared as ridges and valleys. Such shrinkage is obviously a disadvantageous factor in making thermoplastic sheeting having definite physical characteristics. Measurements on sheeting taken directly from the winder gave a lengthwise shrinking at room temperatures within a range of 1 to 2½%. At high room temperatures such as 90 to 95° F. this lengthwise shrinkage takes place rapidly reaching its maximum overall percent in about five hours. After that there is only slight shrinkage at a much lower rate. If the shrinkage on a 2000 foot roll of sheeting is as low as 1% it would theoretically amount to a 20 foot shortening in length which would exert a considerable gripping force within the spool.

An object therefore, of the invention is an improved method of preventing shrinkage of thermoplastic sheeting after it has been wound on a spool or reel.

Another object of the present invention is an improvement over the process described in my copending joint application Serial No. 127,663 whereby the shrinkage of the sheet, treated in accordance with that process, after it is wound on a spool is prevented.

A still further object of the invention is an improved apparatus for processing a thermoplastic sheeting containing residual strains whereby the normal shrinkage component of the sheet when it is wound on a spool is substantially eliminated. Other objects of the invention will appear hereinafter.

In accordance with the invention these and other objects are attained by conducting a suitable thermoplastic sheet through a heating chamber heated at a temperature sufficient to relieve residual strains in the sheet while exerting a minimum of tension on the sheet. The sheet is then alternately calendered and heated, one or more times, to reduce the sheet to desired dimensions. After the final calendering treatment the sheet is passed through an additional heating chamber heated at a temperature sufficient to relieve the residual strains which are normally relieved at room temperature after the sheet has been wound on the spool. It is then hardened under substantially no tension and may be cut to size and if desired wound on a spool without substantial tension being exerted thereon.

The invention will be more clearly understood from the following detailed description with reference to the attached drawing in which there is shown a diagrammatic elevation of my improved apparatus for the treatment of thermoplastic sheeting.

As shown in this drawing, numeral 5 designates a suitable thermoplastic sheeting, which contains residual strains and which may be of varying dimensions, wound on a spool 6 which is mounted on a support 7 and shaft 8.

Driven rolls 9 and 11 serve to unwind the sheet 5 from the spool 6. A pair of conical rolls one of which is shown at 10 serve to center the sheet 5 before it enters the heating chamber 12. The heating chamber 12 comprises an upper platen 13 and a lower platen 14 one or both of which may be heated in a conventional manner for example by steam coils shown at 15 in the lower platen. An endless conveyor belt 16 revolves on drums 17 and 18, one or both of which may be driven if desired by a suitable motive force not shown, and passes thru chamber 12 for supporting and conveying the sheet 5 therethrough without exerting substantial tension upon the sheet. The belt 16 is shielded by a shield 19 to prevent loss of heat from the belt during its rotation. A second pair of conical rolls one of which is shown at 20 further centers the sheet 5 as it leaves the chamber 12. While the sheet might otherwise be drawn thru the chamber 12, a conveyor of the type described permits passage of the sheet with a minimum of tension.

Adjacent the heating chamber 12 is a plurality of calender devices 21, 22, and 23 comprising respectively mounting members 24, 25, and 26, and pairs of calender rolls 27 and 28; 29 and 31; 32 and 33. These rolls are capable of being adjusted to increase or decrease pressure on materials passing therethrough and may be heated or cooled in any suitable manner common in the art. Ahead of each of the calenders 22 and 23 are heating chambers 34 and 35 which may be of conventional design having upper and lower heated platens 36 and 37; and 38 and 39 respectively. If desired these heating chambers may be replaced by heating chambers of the type shown at 12 having an endless conveyor belt associated therewith.

Following the last pair of calendering rolls as shown in the continuation of the drawing on the line A—A, there is an additional heating chamber 55 shown in section, and which is similar in some respects to heating chamber 12. Preferably, however, it is of greater length. The heating chamber 55 comprises an enclosed chamber 56 having openings 57 and 59 in the ends thereof. Thru the length of this chamber moves an endless slat conveyor 58 which revolves about roller 60 and 61 and is supported intermediate the ends of the chamber by a plurality of sprockets 62. The conveyor 58 comprises a plurality of hard wood slats 64 spaced about ¼" apart carried in conveyor chains (not shown in the drawing) at both ends. The chamber 55 is heated by hot water pipes 63 which run lengthwise of the chamber. The heat by convention and radiation is sufficient for uniformly distributing the heat to the sheeting passing therethru.

Following the heating chamber 55 is a pair of conical guide rolls one of which is shown at 41 for the purpose of centering the moving sheet and a pair of larger hollow cooling drums 42 and 43. These drums are positioned in spaced relationship to exhibit the greatest surface of the sheeting passing thereover to cooling effects and cool alternate sides of the sheet. The temperature of these drums may be regulated by suitable cooling fluids, such as cold water which may be introduced into the hollow drums in any satisfactory manner. Following the cooling drums, there is a pair of conical guide rolls one of which is shown at 44, an edge trimming device having blades 45 and 46 interposed in series with a wind up spool 48 mounted on a support 50 and shaft 51.

For convenience of illustration the sheeting is taken from the spool 6. However, it will be understood that this is merely representative of any suitable sheeting feed. For instance, the present apparatus may quite properly constitute an adjunct to the extrusion machine of the Kimble and Blackard application Ser. No. 127,661 filed Feb. 25, 1937. In that case the sheeting extruded by the latter machine is continuously fed thru the oven 12 of my machine.

While various sized sheeting may be processed by my improved method the following example is given to illustrate the operation of the invention.

*Example I*

A suitable spool 6 of sheeting 5 made of a thermoplastic composition of a cellulose derivative such as cellulose acetate and a plasticizer such as dimethyl phthalate is placed on shaft 8 of the apparatus. For purposes of illustration this sheeting may be .030 inch in thickness and 31 inches in width. It is conducted from spool 6 by driven rolls 9 and 11 over conical guide rolls 10 which center the sheet before it passes into heating chamber 12. In this chamber, which may be approximately seven feet in length, the sheet 5 is supported and carried therethrough on the endless conveyor belt 16. The heating chamber is heated to approximately 132° C. with 140 pounds of steam. In this particular example the sheeting is preferably conducted through this heating chamber when it is heated at such temperatures at a rate so that a given portion of the sheet will be in the oven for approximately 80 seconds. This heating, cooperating with the method of supporting and conducting the sheet through the heating chamber without tension permits the residual strains to be dissipated, and the sheet on passing out of the chamber on the conveyor will contain substantially no residual forces which tend to produce shrinkage when being used in the manufacture of laminated glass. For cellulose acetate sheeting and sheeting of similar cellulose derivatives the oven 12 may be maintained at a temperature range of about 90° C. to 150° C. for best results and the time of treatment may be within a range of approximately 30 to 120 seconds.

This heat treatment, however, usually will change the dimensions of the sheet and to assure a sheet of uniform dimensions the sheet is now passed through one or more sets of calender rolls, preferably three sets of calenders 21, 22 and 23 which are preferably maintained at about 50° C., altho they may be maintained at any satisfactory calendering temperature such as from 30° to 80° C. The first pair of calender rolls 27 and 28 are set about .027 inch apart, the second at .026 and the third at .024 giving a final sheet of .025 inch in thickness. Heating chambers 34 and 35 are also preferably maintained at approximately the same temperature as oven 12. The speed of the calender rolls is regulated so as to place a minimum of tension upon the sheet consistent with properly conducting the sheet thru the rolls.

On leaving the last calender 23 the sheet 5 is conducted to heating chamber 55. In this chamber, which may be approximately 6 feet high by 4 feet wide and 25 feet long, the sheet 5 is supported and carried therethru on the endless slot conveyor belt 58. While various temperatures may be employed I have found that a temperature within the range of 55° to 75° C. is satisfactory when the sheet is in the heating chamber for 2 to 4 minutes. The conveyor is run so that there is at all times a little slack in the sheet 5 at 65 and this permits the sheet to enter the heating chamber without tension being exerted thereon. During the treatment in this chamber the residual strain component normally releasable at room temperature is released. Thereafter, the sheet may be rolled up on a spool without subsequent shrinkage.

On leaving the heating chamber 55 the sheet 5 is conducted over conical guide rolls 41 and around cooling drums 42 and 43 without substantial tension being exerted thereon. The cooling drums may be maintained at a temperature of approximately 20° C. The sheet being thus processed and cooled under substantially no tension will contain a minimum of residual strains. Accordingly it may be employed as the safety lamination in laminated glass with the assurance that a substantially uniform product will result, since the principal causes of shrinkage therein have been substantially eliminated. From the cooling drums the sheet is trimmed to a desired width by revolving blades 45 and 46 and then rolled up on spool 48.

The calender rolls, the cooling rolls and the take-up spool may be driven by any suitable source of power and controlled as is consistent with the invention.

It will be understood that my process is applicable to any suitable sheet which as in the above example has been formed and rolled up on a spool. However, as before stated, my process may be used in cooperation with a suitable extrusion process for making thermoplastic sheeting such as that described in the above named copending application of Kimble and Backard Ser. No. 127,661 so that any strains which may be introduced by extruding and conducting the sheet away from the die may be relieved before the sheet has cooled appreciably below the temperature of the die.

While I do not wish to be committed to any exact theory of explanation of the good results obtained by the process and apparatus above described they are, I believe that any cast sheet, regardless of how it obtains its natural shape, contains residual strains and when the sheet is passed through the heating chamber 12, these strains equalize themselves. At the same time, due to this heat treatment, the sheet may lose its exact dimensions somewhat and accordingly in order to reduce the sheet again to exact dimensions it must be calendered. The heating in the oven 12 therefore accomplishes the additional function of softening the sheet thoroughly so that it may be calendered with ease. While one calendering may suffice, I have found that if the sheet is to be reduced in thickness to any considerable extent, it is better to reduce the thickness of the sheet in small increments. Thus after the sheet has passed through the first set of calender rolls it is again softened in preparation for the next calendering step, etc., until the desired uniform thickness is obtained. In accordance with the present invention I have found that the additional treatment in chamber 55 practically eliminates the residual strain component which is releasable at room temperatures when the sheet is stored awaiting use.

What I claim is:

1. The continuous method of improving the physical characteristics of thermoplastic sheeting which comprises heating the sheet, to an extent which will permit residual strains therein to equalize, in a heated conditioning chamber while supporting the sheet without substantial tension being exerted thereon, then reducing the thickness of the sheet by passing it through a calender, further heating the sheet, further reducing the thickness of the sheet by a final calendering operation, then conducting the sheet through a final heated conditioning chamber while supporting the sheet without substantial tension being exerted thereon whereby strains in the sheet normally releasable at room temperatures are released, and cooling the sheet while under substantially no tension.

2. The continuous method of improving the physical characteristics of thermoplastic sheeting which comprises heating the sheet, to an extent which will permit residual strains therein to equalize, in a heated conditioning chamber while supporting the sheet without substantial tension being exerted thereon, then reducing the thickness of the sheet by passing it through a calender, further heating the sheet, further reducing the thickness of the sheet by a final calendering operation, then conducting the sheet through a final heated conditioning chamber maintained at a temperature from 50° C. to 75° C. while supporting the sheet without substantial tension being exerted thereon whereby strains in the sheet normally releasable at room temperatures are released, and cooling the sheet while under substantially no tension.

JOHN S. KIMBLE.